United States Patent
Cope et al.

(10) Patent No.: US 7,242,755 B2
(45) Date of Patent: *Jul. 10, 2007

(54) DYNAMIC ROUTING FOR A TELEPHONE CONFERENCE CALL

(75) Inventors: Warren B. Cope, Olathe, KS (US); Rakesh P. Samtani, Kansas City, MO (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 11/243,942

(22) Filed: Oct. 5, 2005

(65) Prior Publication Data

US 2006/0072728 A1    Apr. 6, 2006

Related U.S. Application Data

(63) Continuation of application No. 10/436,625, filed on May 13, 2003, now Pat. No. 6,978,002.

(51) Int. Cl.
*H04M 3/56* (2006.01)
*H04M 7/00* (2006.01)
*H04L 12/18* (2006.01)

(52) U.S. Cl. ............. 379/202.01; 370/260; 379/221.06; 379/221.07

(58) Field of Classification Search ............... 370/260, 370/261, 262, 270; 379/202.01–206.01, 379/220.01, 221.05–221.07
See application file for complete search history.

(56) References Cited

U.S. PATENT DOCUMENTS 6,978,002 B1* 12/2005 Cope et al. ............. 379/202.01

\* cited by examiner

*Primary Examiner*—Harry S. Hong

(57) ABSTRACT

A method and system are disclosed to provide a conference among conference participants over a communication network. A routing system receives conference utilization data from a plurality of conference systems. The routing system receives a request to join the conference from one of the conference participants. The routing system processes the conference utilization data in response to the request to select one of the conference systems. The one conference system joins the one participant to the conference in response to the selection of the one conference system.

20 Claims, 12 Drawing Sheets

DYNAMIC ROUTING FOR A TELEPHONE CONFERENCE CALL

RELATED APPLICATIONS

This Patent Application is a continuation of U.S. patent application Ser. No. 10/436,625; entitled "DYNAMIC ROUTING FOR A TELEPHONE CONFERENCE CALL;" filed on May 13, 2003, now U.S. Pat. No. 6,978,002; and which is hereby incorporated by reference into this Patent Application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to telephone conference calls.

2. Description of the Prior Art

Telephone conference calls allow telephone conversations between three or more persons. A telephone conference call, or teleconference, is typically performed by a telephone system device called a bridge. The bridge joins together multiple participants to enable group communication. In order to join the teleconference, each participant is typically given a pre-assigned telephone number to call. In the prior art, the pre-assigned number is statically assigned to the teleconference before the teleconference actually occurs, and may be assigned days in advance. When the participant dials in, the telephone system receives the pre-assigned bridge telephone number and may ask the participant for a password or personal identification number (PIN). The participant is then connected to a corresponding conference bridge by a telephone system and may join a conference.

In the prior art, teleconference bridging is commonly performed through bridge facilities. Typically, such bridge facilities are located in various geographic areas, and can handle large numbers of incoming conference calls. Each bridge facility can contain multiple bridges and additionally can contain a routing device, including a Voice Response Unit (VRU) and processor. A call coming into the bridge facility is routed to a particular bridge in the bridge facility by the routing device.

However, the prior art static bridging approach has several drawbacks. Due to the popularity of telephone conferencing, many people may be participating at any time. If load changes occur, the bridge facility has to perform some manner of load balancing. Some examples of load changes are when participants drop out of a teleconference, when unexpected participants join a teleconference, when a technical problem occurs in any part of the bridging system, etc. The prior art attempts to avoid load balancing by under-utilizing bridges, i.e., each bridge in a bridge facility is typically not fully loaded. For example, each bridge in a prior art bridge facility is typically loaded to only about 60% of capacity in order to allow for unforeseen load changes.

FIG. 1 shows a telephone system performing a prior art load balancing. In this example, a first bridge facility 101 needs to transfer some conference call traffic to a second bridge facility 102. The prior art load balancing is accomplished by the first bridge facility 101 linking to the second bridge facility 102 and passing some conference calls to the second bridge facility 102. The circuits 103 from the callers to the first bridge facility 101 are maintained, and are linked to the second bridge facility 102 via additional telephone circuits 104, as shown. The prior art load balancing approach therefore ties up the additional circuits 104. In addition, the prior art load balancing approach occurs only after a traffic problem has occurred, and does not prevent loading problems. Geographic load balancing, wherein a bridge facility is selected according to the location of the caller and the bridge, is not achieved. Furthermore, the prior art requires computationally expensive VRU technology at a bridge facility. Moreover, the routing device and the VRU are unnecessarily duplicated in each bridge facility.

SUMMARY OF THE INVENTION

Examples of the invention include a method and system of providing a conference among conference participants over a communication network. A routing system receives conference utilization data from a plurality of conference systems. The routing system receives a request to join the conference from one of the conference participants. The routing system processes the conference utilization data in response to the request to select one of the conference systems. The one conference system joins the one participant to the conference in response to the selection of the one conference system.

In some examples of the invention, the conference utilization data indicates current utilization of the conference systems.

In some examples of the invention, the conference utilization data indicates unused capacity of the conference systems.

In some examples of the invention, processing the conference utilization data to select the one conference system comprises load balancing among the conference systems.

In some examples of the invention, the conference was assigned a conference identifier during a conference registration occurring before the request to join the conference, and wherein the request to join the conference indicates the conference identifier.

In some examples of the invention, the routing system determines a geographic location of the one conference participant in response to the request.

In some examples of the invention, the routing system processes the geographic location of the one conference participant to select the one conference system.

In some examples of the invention, the one conference participant comprises a conference host.

In some examples of the invention, the routing system determines geographic locations of the conference systems, and in response to the request, determines a geographic location of the one conference participant and processes the geographic locations of the conference systems and the one conference participant to select the one conference system.

In some examples of the invention, the routing system determines geographic locations of the conference systems and the conference participants, and in response to the requests processes the geographic locations of the conference systems and the conference participants to select the one conference system.

BRIEF DESCRIPTION OF THE DRAWINGS

The same reference number represents the same element on all drawings.

DETAILED DESCRIPTION OF THE PREFERRED EMBODIMENT

FIGS. 2–12 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
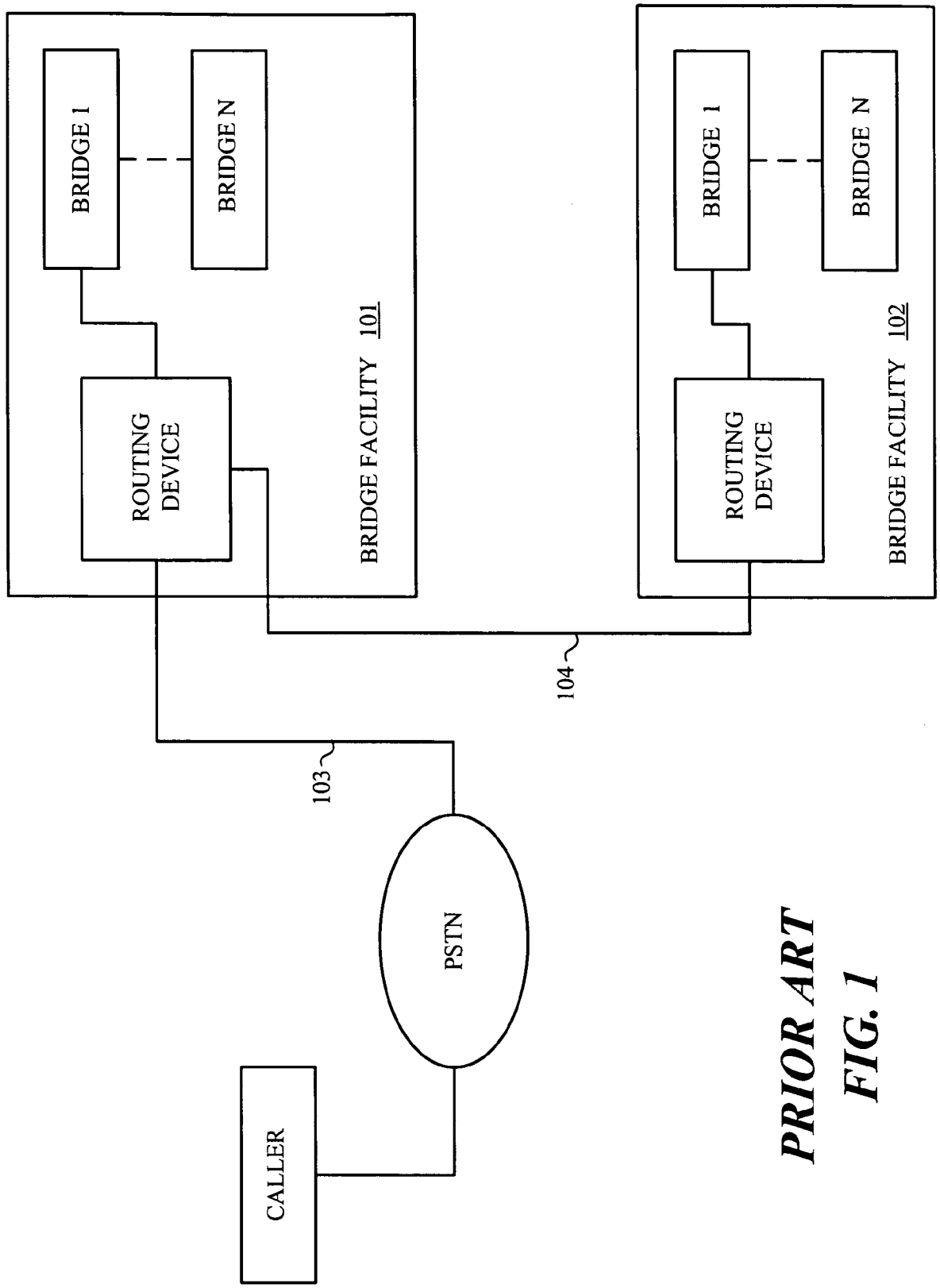
FIG. 1 shows a telephone system performing, a prior art load balancing.
Figure 2:
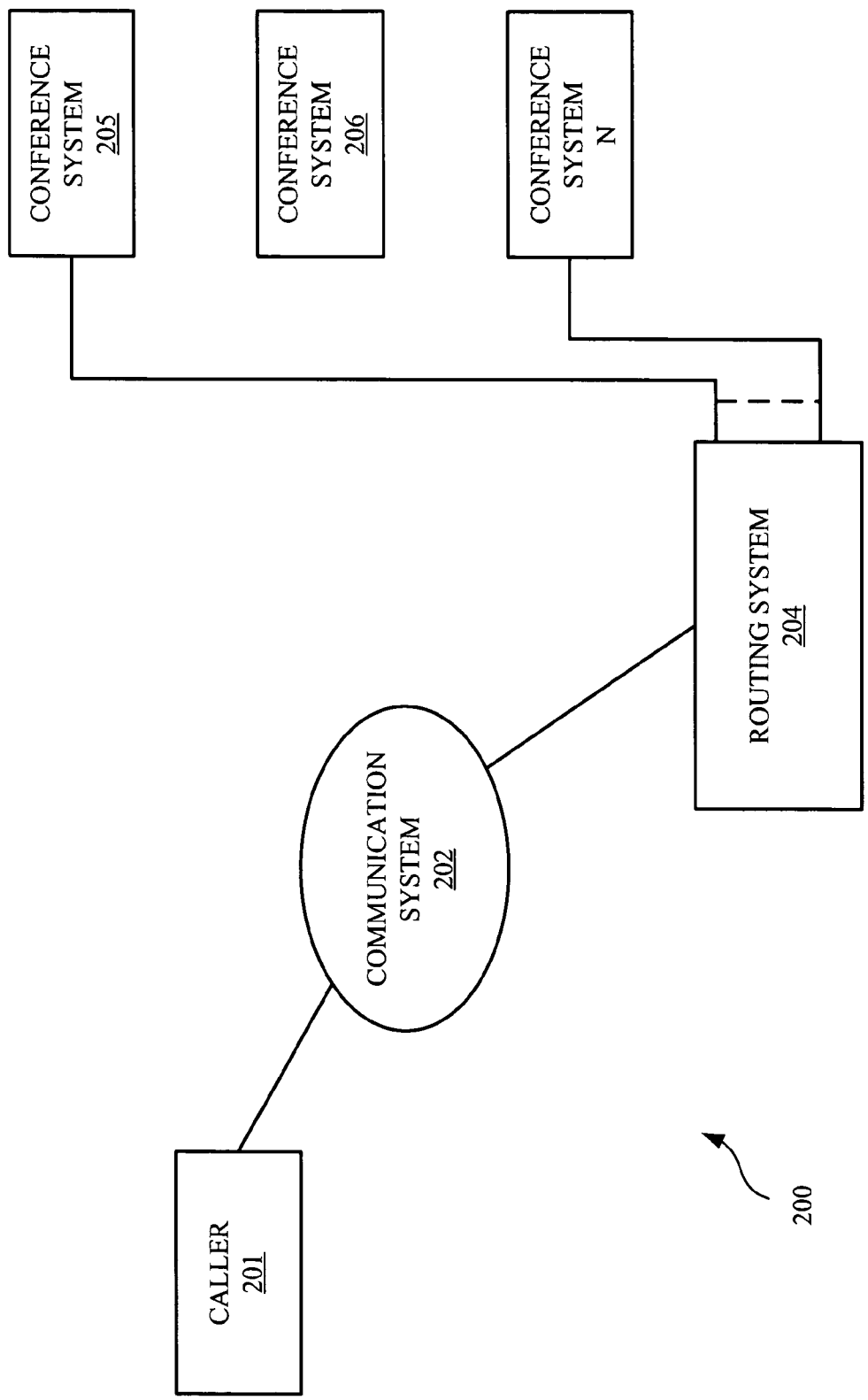
FIG. 2 shows a communication system according to an embodiment of the invention.

FIG. 2 shows a communication system 200 according to an embodiment of the invention. The communication system 200 includes a communication system 202, a routing system 204, and a plurality of conference systems 205, 206, etc. In operation, multiple callers 201 can be dynamically routed and connected to a particular conference system through the communication system 202 using the routing system 204. The dynamic routing according to the invention is enabled and performed by the routing system 204.

The communication system 202 can comprise any manner of telephone communication network. The communication system 202 can include any manner of telephone wire, cable, optical fiber, etc., and any number of switches, routing devices, etc. The communication system 202 can comprise all or part of a communication network. In addition, the communication system 202 can include any manner of satellite or cellular telephone communication system. In one embodiment, the communication system 202 comprises a Public Switched Telephone Network (PSTN) 202 (see FIGS. 7, 9, and 11).

The conference systems 205, 206, etc., may be any type of telephone conference systems. In one embodiment, a conference system comprises a telephone conference bridge. The conference systems may be situated at various geographic locations. In one embodiment, the conference systems 205, 206, etc., are located in a bridge facility (not shown).

The routing system 204 communicates with the conference systems 205, 206, etc., and receives utilization statistics therefrom. The utilization statistics for each conference system can include a conference system identifier, a conference system geographic location code, and a conference system capacity, for example. In addition, the utilization statistics can include a conference system utilization that indicates a currently used capacity or a currently unused capacity for the particular conference system.

The routing system 204 according to the invention participates in the routing function and provides a dynamic routing for a conference call. In some embodiments, the routing system 204 interacts with a Remote Processor (RP) to accomplish the dynamic routing (see FIGS. 7, 9, and 11 and the accompanying discussions). Consequently, in such embodiments, the routing system 204 is configured to modify routing tables or other data structures within the RP. In other embodiments, the routing system 204 interacts with other components of the communication system 202 in order to achieve the dynamic routing (see FIG. 7). The routing system 204 therefore can perform dynamic routing based on current conditions and current utilizations of the various conference systems. In addition, the routing system 204 can perform load balancing and can further perform geographic load balancing, as will be discussed further below.

The routing system 204 can be an independent component, as shown, or alternatively can be integrated into one of the components of the communication system 202. For example, the routing system 204 can be integrated into the RP.

Figure 3:
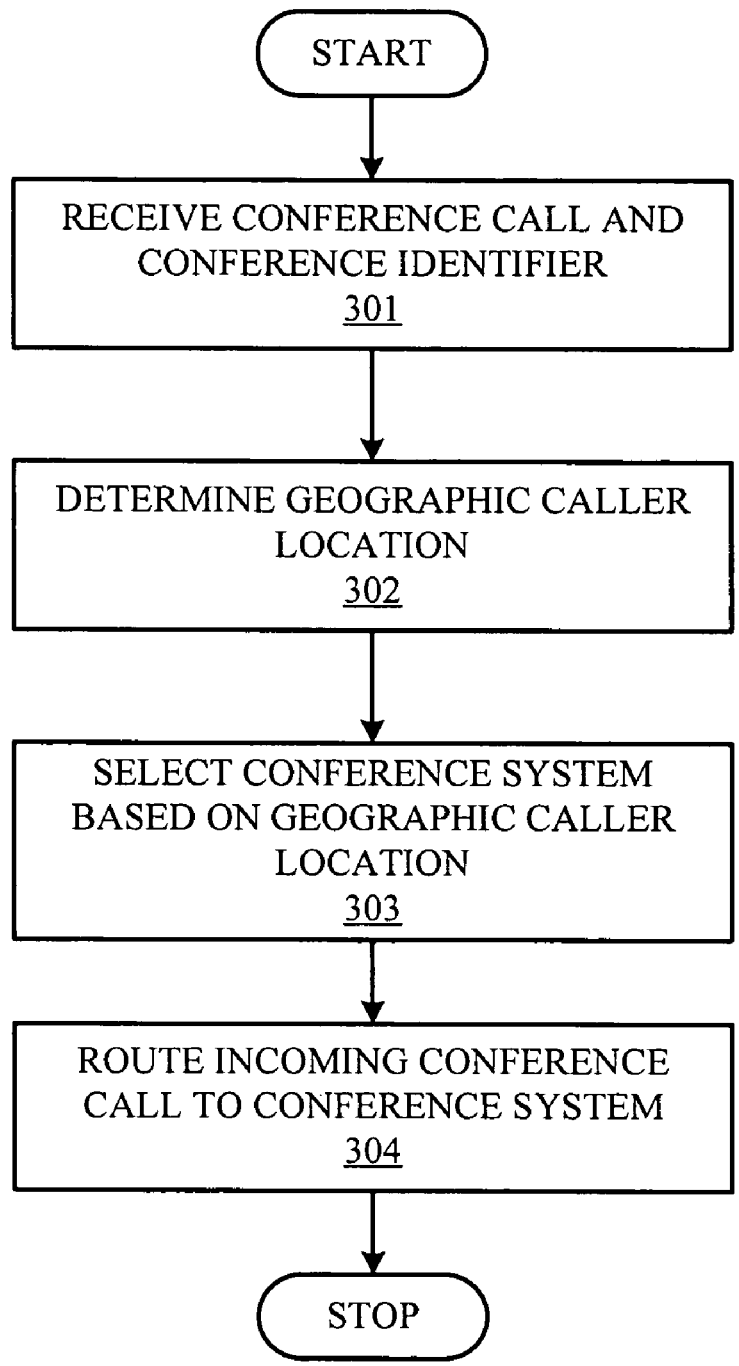
FIG. 3 is a flowchart that illustrates a method of dynamically routing an incoming conference call to a selected conference system according to an embodiment of the invention.

FIG. 3 is a flowchart 300 that illustrates a method of dynamically routing an incoming conference call to a selected telephone conference system according to an embodiment of the invention. In step 301, a conference call and conference identifier are received. Any telephone call coming through the communication system 202 will include certain information, such as the caller number (i.e., the telephone number of the telephone used to make the call), and the destination number. In addition to the caller number and the destination number, the incoming conference call includes a conference identifier that is entered by the incoming caller, such as an account number, pin number, etc. When a conference initiator registers for the conference call, a conference identifier is typically assigned to the telephone conference and is given to the conference initiator. The conference initiator relays the conference identifier to all participants. Therefore, any conference participant desiring to join the conference can supply the number and be joined to a new or ongoing, telephone conference. The conference identifier may be interactively obtained from the caller 201 (see FIG. 7 and the accompanying discussion).

The destination number may be a number unrelated to a specific conference system, such as a 1-800 or 1-900 number (i.e., 1-888-xxx-xxxx), for example. In this embodiment, the 1-800 or 1-900 number is intercepted by the communication system 202 and is used to consult the routing system 204. The routing system 204 dynamically identifies and selects the ultimate destination conference system telephone number.

Alternatively, the destination number may be a number of a specific telephone conference system, wherein the routing system 204 intercepts the call and dynamically reroutes the call to a new conference system, regardless of the previous assignment of a conference system.

In step 302 the communication system 202 determines the geographic caller location.

This may be accomplished using, the caller's telephone number, such as through an Automatic Number Identification (ANI) system, for example. Alternatively, this function can be performed by the routing system 204, wherein a caller number can be correlated to a physical location through some manner of table or data structure. In another alternative, the geographic caller location can be provided by the calling, telephone device if the calling telephone device includes a positioning capability, such as a satellite positioning receiver, for example.

In step 303, a conference system is selected for the incoming conference call. The selection can be based on the geographic caller location, the geographic conference system location, or a combination of caller and conference system locations. The selection may be based on locations of one or more callers, may include a large area containing all the callers, or may be restricted to an area of a majority or a certain number of the callers. The geographic caller location can correspond to the location of the conference host/initiator or can correspond to the first person to call in to the conference. Therefore, for example, if the telephone conference call includes callers from multiple locations such as different sites around a particular city, the whole city may be viewed as the geographic caller location. Alternatively, a county or state or other geographic area may be the geographic caller location. In another alternative, the geographic selection is based on the first caller to call in to the conference call. In this manner, the dynamic routing according to the invention can geographically select a conference system based on the geographic location of some or all of the conference callers. This has the advantage of minimizing the telephone lines needed in order to conduct a conference call, i.e., it would make sense to select a conference system in California if the participants are in California. This is in contrast to the prior art, wherein the geographic location of the callers and the conference system are not taken into account. As a result, in the prior art the conference participants are often linked across large distances.

Alternatively, in another example, the caller and the conference system are both in New York, but the conference system is 80% loaded, while a suitable conference system in Miami is only 60% loaded. The caller can be routed to the Miami conference system according to the invention, thereby balancing the load. The invention allows a communication system carrier to accept an additional trunking cost in order to keep the conference participants in-system and avoid having to transfer or link to another communication carrier, such as a carrier having an available conference system in New York.

In step 304, the incoming conference call is routed to the selected conference system. The routing for a first conference call participant can be subsequently used for all of the rest of the conference participants. The subsequent routing uses the conference identifier, i.e., the conference identifier is associated with the conference system in the routing system 204.

Figure 4:
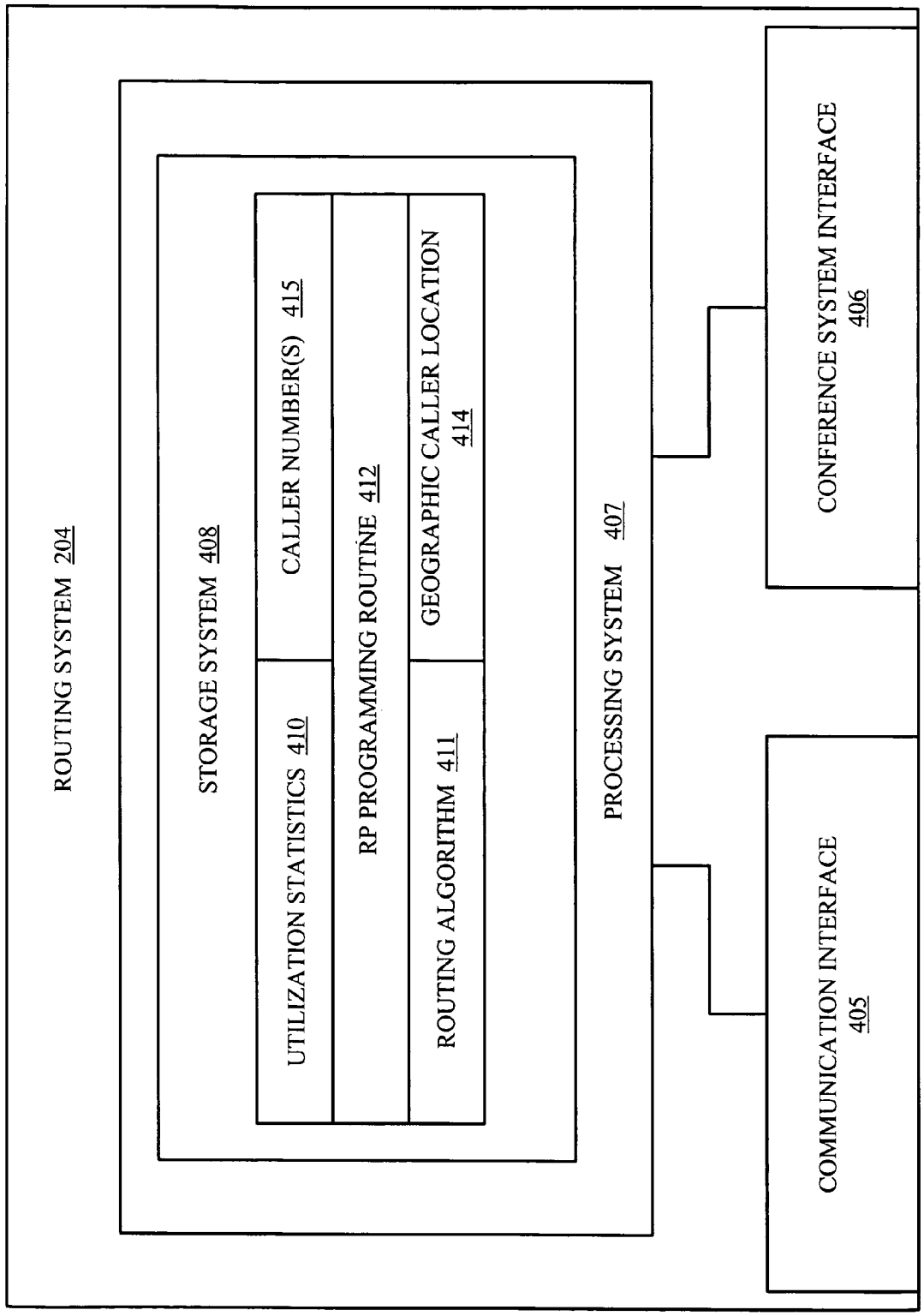
FIG. 4 shows detail of a routing system according to an embodiment of the invention.

FIG. 4 shows detail of the routing system 204 according to an embodiment of the invention. The routing system 204 includes a communication interface 405 (such as an RP interface), a conference system interface 406, and a processing system 407. The processing system 407 may include a storage system 408. The processing system 407 is connected to both the communication interface 405 and the conference system interface 406.

The communication interface 405 can comprise any device capable of communicating with the communication system 202 or devices in communication with the communication system 202 (see FIG. 2). The communication interface 405 can include a modem, a network card, etc. Likewise, the conference system interface 406 can comprise any device capable of communicating with the conference systems 205, 206, etc., and can include a modem, a network card, etc. In one embodiment, the communication interface 405 and the conference system interface 406 comprise a single communication interface configured to communicate with both the communication system 202 and the conference systems 205, 206, etc.

In operation, the processing system 407 receives utilization statistics from the conference systems 205, 206, etc., through the conference system interface 406. The routing system 204 therefore can perform a dynamic routing operation by obtaining utilization statistics and dynamically providing routing information to the communication system 202.

The storage system 408 can store data and software routines. The storage system 408 can store utilization statistics 410, a routing algorithm 411, a RP programming routine 412, a called conference system number 413, a geographic caller location 414, and a caller number(s) 415, for example. Other variables can be stored as necessary.

The utilization statistics 410, as previously discussed, can include conference system identifiers, geographic conference system location codes, and a conference system capacity and/or system utilization for each conference system. Therefore, each entry of the utilization statistics 410 includes information about a particular conference system that can be recalled and used for dynamic routing. In one embodiment, the utilization statistics 410 are stored as a data table, although other data structures can be employed.

The routing algorithm 411 processes the utilization statistics 410 and the geographic caller location 414 in order to produce routing information that determines a routing to a selected conference system. The routing algorithm 411 therefore performs a dynamic routing, wherein the routing is determined at the time the conference call is initiated (and not beforehand, as in the prior art).

The routing algorithm 411 further performs load balancing, wherein the routing algorithm 411 employs the utilization statistics 410 in order to select conference systems having a low level of utilization over conference systems having a high level of utilization. Furthermore, the routing algorithm 411 performs geographic load balancing, wherein the routing algorithm 411 selects a conference system based on both a utilization level and a geographic location. In this manner, the routing algorithm 411 can select an optimally loaded conference system that is geographically most desirable.

The RP programming routine 412 is a routine for programming variables in the RP. The RP programming routine 412 receives the routing information from the routing algorithm 411 and programs it into the RP. As a result, the routing system 204 can modify the RP at any time and can dynamically update routing information stored in the RP.

The caller number 415 stores the number of an incoming conference caller(s). The routing algorithm 411 can subsequently access the caller number 415 in order to perform the geographic load balancing. In one embodiment, the caller number 415 can include a geographic location of the caller.

Figure 5:
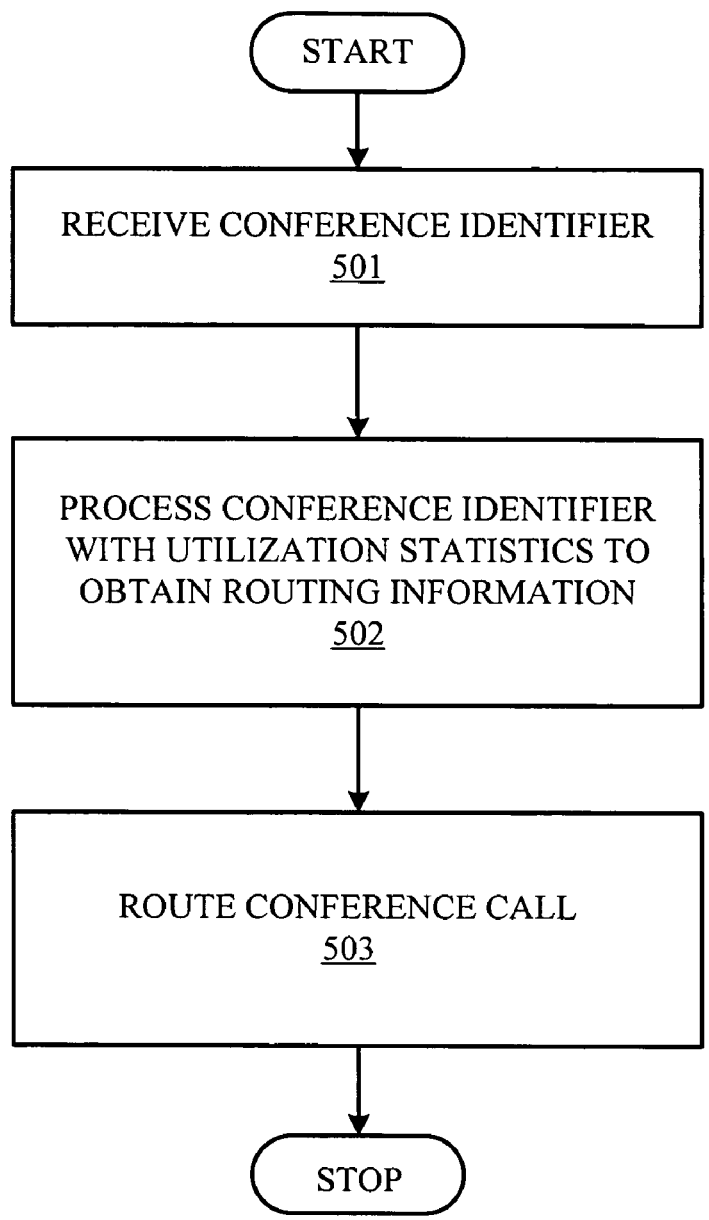
FIG. 5 is flowchart that illustrates a method of dynamically routing an incoming conference call to a selected conference system according to an embodiment of the invention.

FIG. 5 is flowchart 500 that illustrates a method of dynamically routing an incoming, conference call to a selected telephone conference system according to an embodiment of the invention. In step 501, a conference call and a conference identifier are received, as previously discussed. The conference identifier is used to join all callers to a particular conference, and therefore may be associated with a conference system that is selected according to the method.

In step 502, the conference identifier is processed with the utilization statistics to select a conference system 205, 206, etc., and generate the routing information.

In step 503, the conference call is routed to the conference system selected by the routing, system 204. In one embodiment, this includes programming the RP with the routing information. The routing information therefore directs the RP to provide routing to the selected conference system. The routing, information can be transferred to the RP for programming via a landline or wireless telephone link, or via a packet network, such as a local-area network (LAN), a wide area network (WAN), a virtual private network (VPN), or the Internet, for example.

Figure 6:
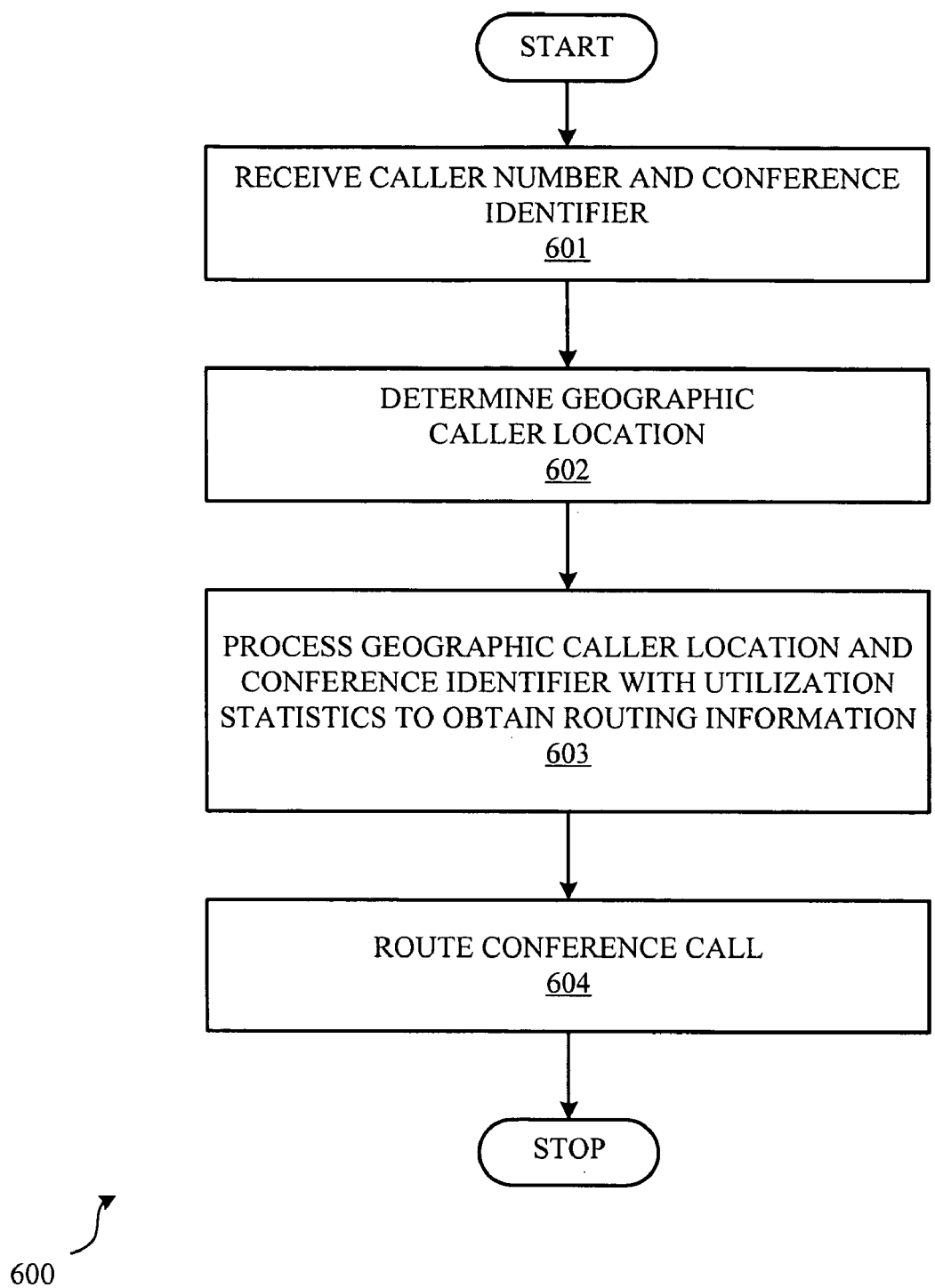
FIG. 6 is a flowchart that illustrates a method of dynamically routing an incoming conference call to a selected conference system according to an embodiment of the invention.

FIG. 6 is a flowchart 600 that illustrates a method of dynamically routing an incoming conference call to a selected telephone conference system according, to an embodiment of the invention. In step 601, a conference call and a conference identifier are received, as previously discussed.

In step 602, the geographic caller location is determined, as previously discussed. This may be through use of an automatic number identification (ANI) system or through a table or other data structure that relates a caller to a location.

In step 603, the conference identifier, the geographic caller location, and the utilization statistics are processed to select a conference system, as previously discussed. The utilization statistics can include a geographic conference system location code. The utilization statistics in one embodiment are periodically or intermittently received, while in another embodiment the utilization statistics are requested as needed, such as when a conference call is starting. In one embodiment, utilization statistics for a particular conference system are transmitted by the conference system upon a change in a utilization level of the conference system. It should be understood that the utilization statistics for individual conference systems are not constrained to be received simultaneously. The utilization statistics can be transferred from the conference systems to the conference RP 721 over a landline or wireless telephone link, or can be transferred over a packet network link, such as a local-area network (LAN), a wide area network, (WAN), a virtual privates network (VPN), or the Internet, for, example.

In step 604, the conference call is routed to the conference system that is selected by the routing system 204. In one embodiment, this includes programming the RP with the routing, information, as previously discussed. In this embodiment, the dynamic routing according to the invention performs both dynamic routing and geographic load balancing.

Figure 7:
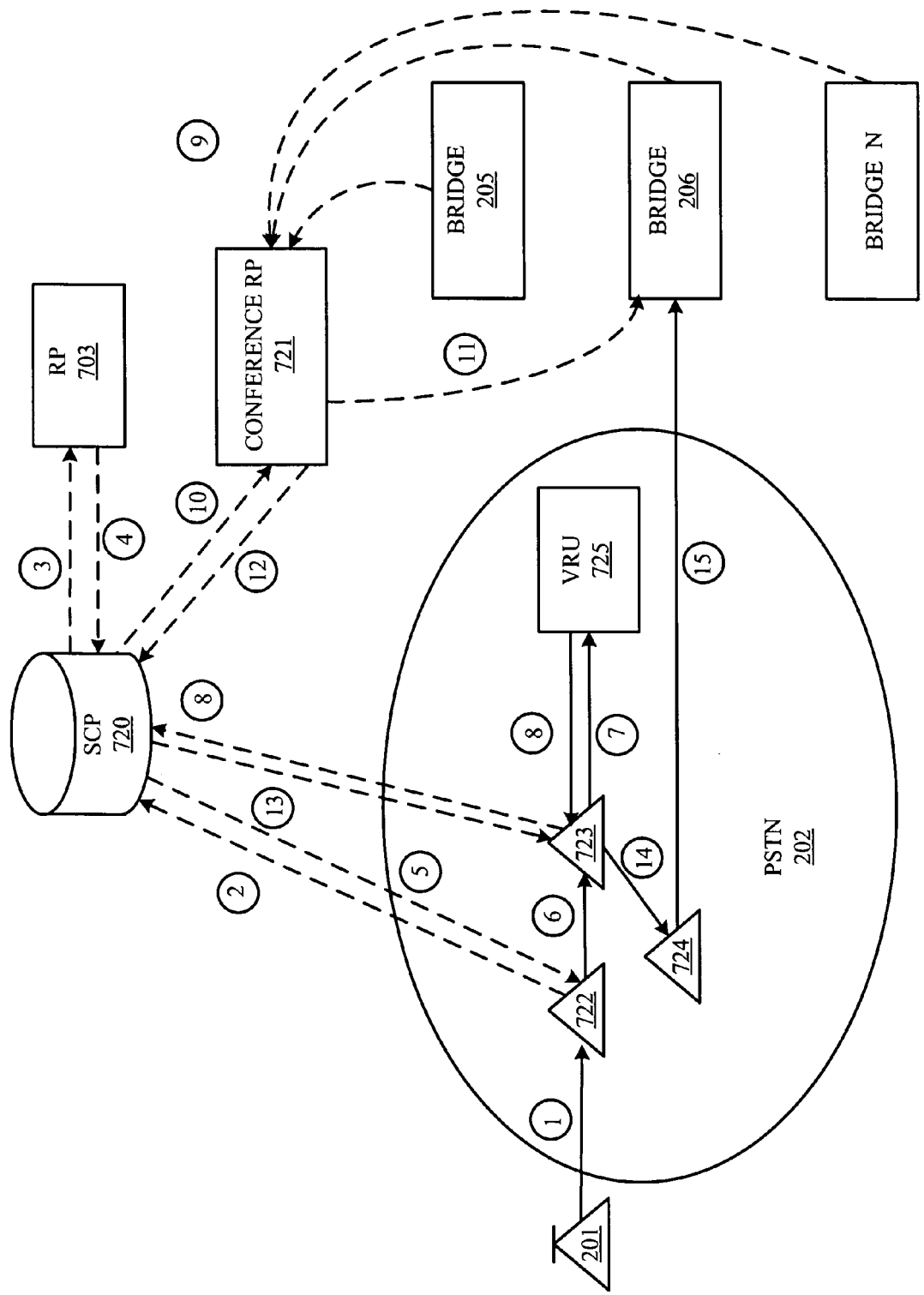
FIG. 7 is a diagram of a communication system according to an embodiment of the invention.

FIG. 7 is a diagram of a communication system 700 according to an embodiment of the invention. The communication system 700 includes a PSTN 202, a service control point 720, an RP 703, a conference RP 721, and a plurality of telephone conference bridges 205, 206, etc. The PSTN 202 can include, among other things, a plurality of switches 722–724 and a voice response unit (VRU) 725. The VRU 725 can be used to interact with the caller 201 and receive information such as the conference identifier, etc. It should be understood that the embodiment shown is just one configuration and there are other network configurations can be employed. The embodiment shown is provided in conjunction with the message flow diagram of FIG. 8 in order to illustrate in detail how the dynamic routing can be accomplished.

The RP 703D performs routing functions for the communication system 202, as is known in the art. The RP 703D can be part of the communication system 202, or may be part of a client facility. For example, the RP 703 may be owned by a business or other entity and may be used to route telephone calls for that entity, including teleconference calls. The RP 703 can be programmed on the fly to achieve routing functions, including programming the RP 703 with routing information based on the current utilization and/or status of the conference systems 205, 206, etc.

The conference RP 721 can comprise a RP provided for dynamic routing. The conference RP 721 can be included in the communication system 700 in addition to existing RPs, such as the RP 703, and participates in the dynamic conference call routing.

Figure 8:
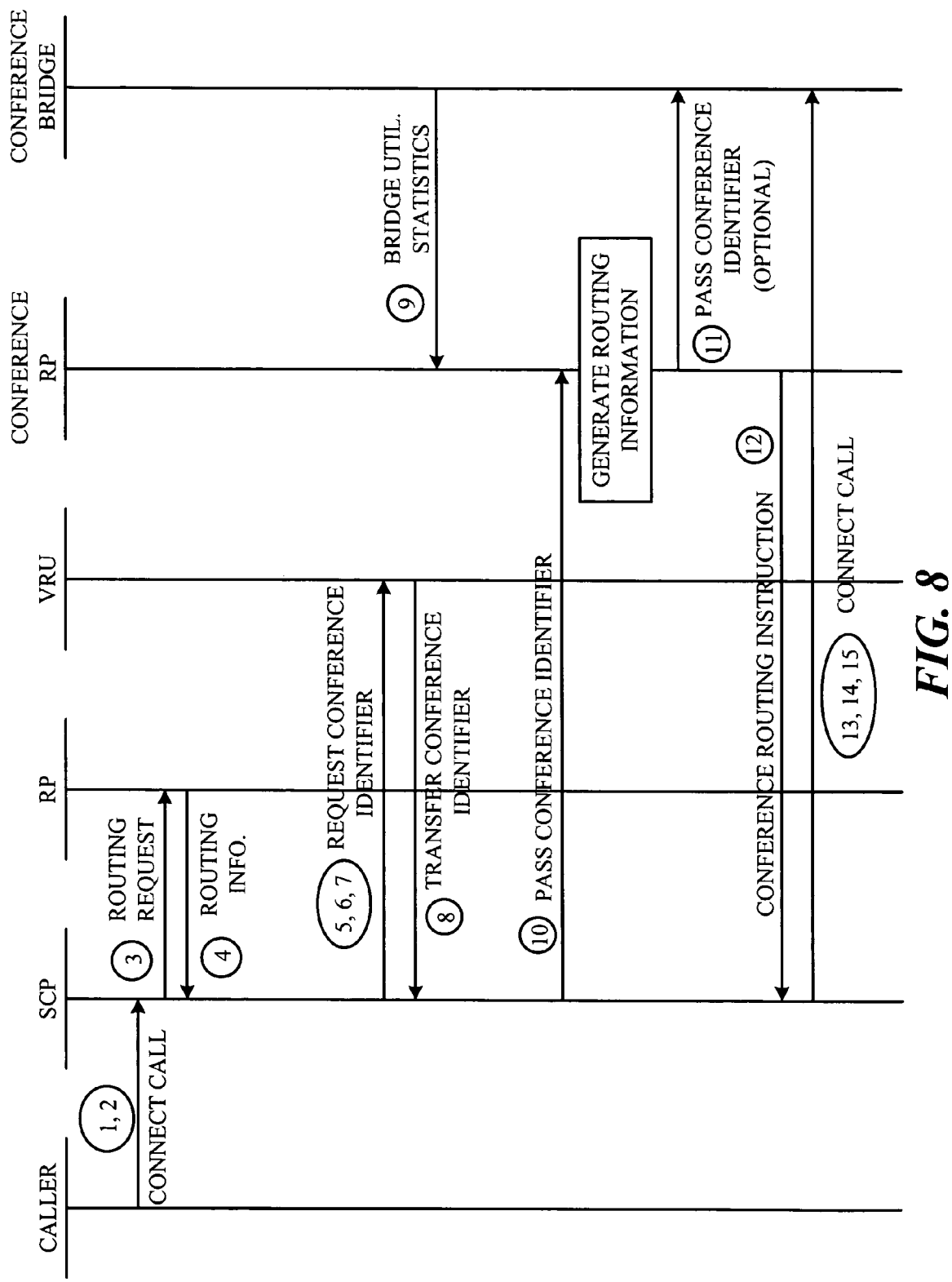
FIG. 8 is a corresponding message flow-diagram that illustrates a dynamic routing operation according to the embodiment of FIG. 7.

FIG. 8 is a corresponding message flow diagram that illustrates a dynamic routing operation according to the embodiment of FIG. 7. The various actions performed to accomplish the dynamic routing are shown as a series of numbered lines. The solid lines represent telephone connections, while the dashed lines represent signaling connections that are used to signal various components and/or to transfer information between systems and components.

Referring to both FIG. 7 and FIG. 8, at arrow 1 the caller 201 calls the PSTN 202. The connection can be achieved through a pre-assigned conference bridge number (i.e., a fixed number corresponding to a physical bridge), or a 1-800 or 1-900 conference number, for example, that merely connects the caller to the PSTN 202. The caller 201 connects to a local switch 722, which then at arrow 2 signals the service control point 720. The signal in effect requests routing instructions for the switch 722 in order to connect the conference call.

At arrow 3, the SCP 720 requests routing information from the RP 703. The SCP 720 and the RP 703 are generally components of the PSTN 202. However, alternatively the RP 703 may be considered to be outside of the PSTN 202 and can be controlled by an outside entity, such as to control routing operations. For example, the RP 703 can be programmed and modified by a corporation or business entity to control call routing for that entity.

At arrow 4, the RP 703 responds to the SCP 720 with routing, information. In this embodiment, the RP 703 directs the SCP 720 to connect to a Voice Response Unit (VRU) 725 of the PSTN 202.

At arrow 5, the SCP 720 directs the switch 722 to connect the caller 201 to the (VRU) 725 through arrows 6 and 7. This connection is done in order to initiate an interaction with the caller 201. In one embodiment, the VRU 725 generates an audio message that instructs the caller 201 to enter a conference identifier number. Therefore, during the interaction the VRU 725 requests and receives a conference identifier from the caller 201.

At arrow 8, the VRU 725 transfers the conference identifier (and any other conference information) back to the SCP 720 through the switch 723. Alternatively, in some embodiments the VRU 725 can communicate the information directly to the SCP 720 (not shown). In addition, the VRU 725 can provide correlation data to the SCP 720, such as a verification of the identity of the caller. It can be seen that more than one switch may be used to communicate with the VRU 725, such as connecting through a switch 723D that is local to the VRU 725. The VRU 725 therefore may be any one of a number of network VRUs and the RP 703D can select a VRU to be used. It should be understood that arrows 7 and 8 represent an actual connection of the caller 201 to the network VRU 725. However, the connection to the VRU 725 may be dropped after the conference information is obtained and may comprise temporary connections.

At arrow 9, the conference RP 721 receives utilization statistics from the conference bridges 205, 206, etc. As previously discussed, the utilization statistics can be received on request by the conference RP 721 or upon the initiative of a conference bridge.

At arrow 10, the SCP 720 provides the conference identifier to the conference RP 721. In addition, the SCP 720 may provides the caller telephone number and a geographic caller location to the conference RP 721.

At arrow 11, the conference RP 721 can optionally provide the conference identifier to the conference bridges 205, 206, etc., or can provide it only to an intended bridge selected for the dynamic routing (i.e., provides it to the selected bridge 206 in the example shown).

At arrow 12, the conference RP 721 provides the routing information to the SCP 720.

At arrow 13, the SCP 720 provides the routing information to the PSTN 202, such as through the switch 723, for example (shown). It should be understood that the routing information can be transmitted over other paths, such as through switch 722 and then through switches 723 and 724. The PSTN 202 relays the routing information to appropriate switches. Subsequently, at arrows 14 and 15, the caller 201 is connected to the selected bridge 206. It should be noted that the switches 722 through 724 shown merely for illustration and different numbers or locations of the switches may be actually required in order to complete the teleconference call.

Figure 9:
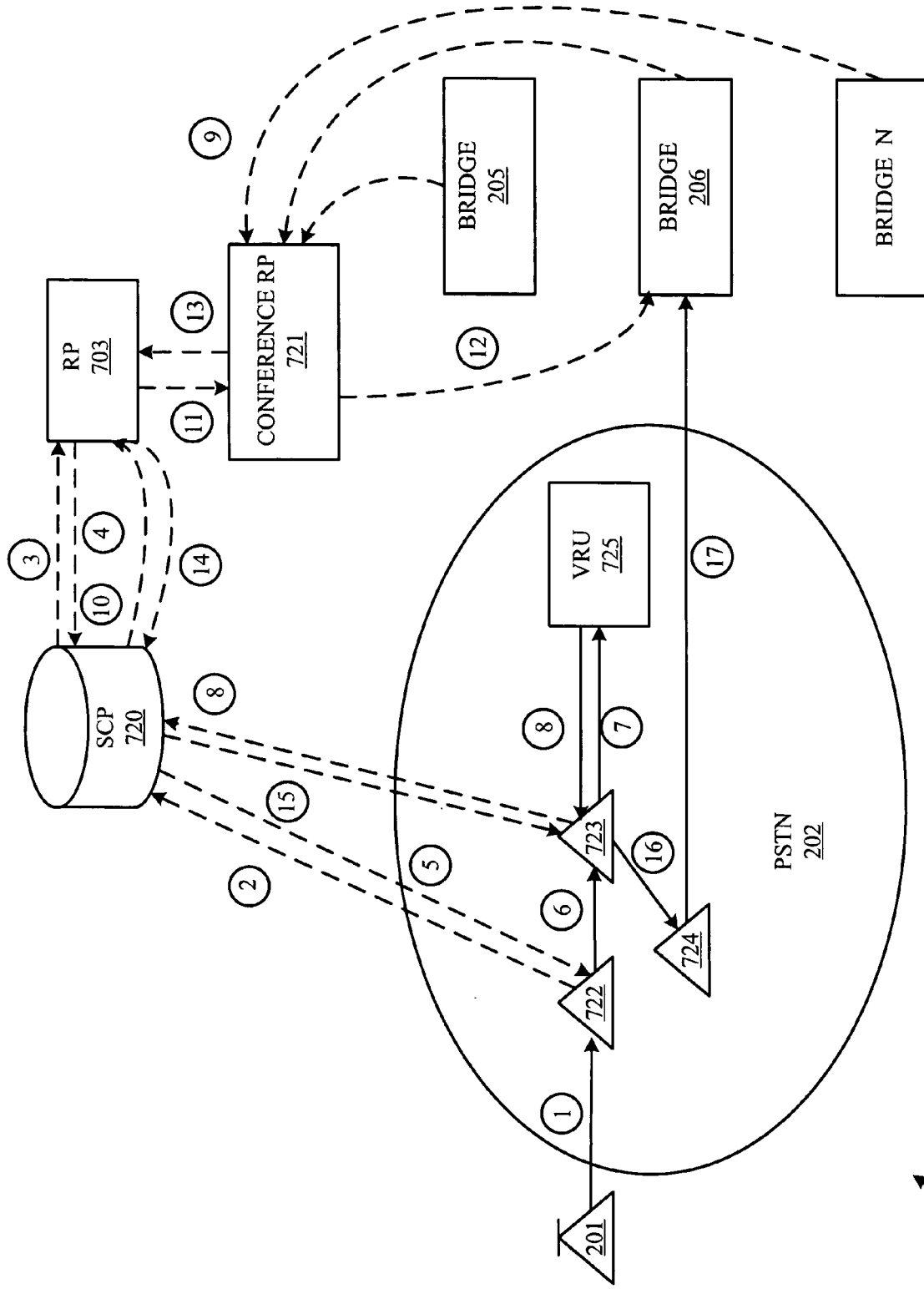
FIG. 9 is a diagram of a communication system according to another embodiment of the invention.
Figure 10:
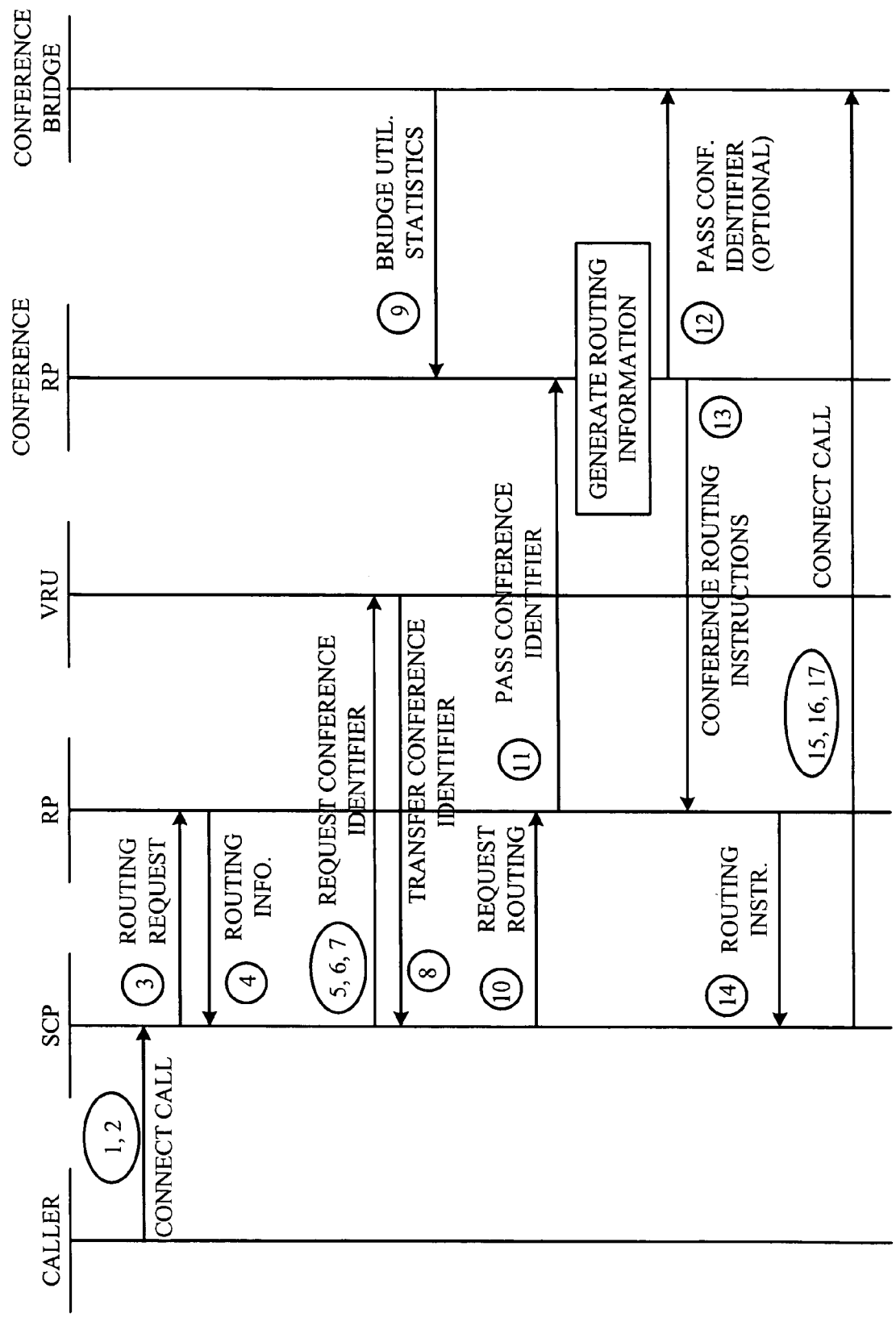
FIG. 10 is a corresponding message flow diagram that illustrates a dynamic routing operation according to the embodiment of FIG. 9.

FIG. 9 is a diagram of the communication system 700 according to another embodiment of the invention, while FIG. 10 is a corresponding message flow diagram that illustrates a dynamic routing operation according to the embodiment of FIG. 9. FIG. 9 is similar to FIG. 7 except that in the embodiment of FIG. 9 the conference RP 721 does not communicate directly with the SCP 720. The difference can be seen in the message flow of FIG. 10, wherein arrows 1–9 are identical to those in FIG. 8 and will not be discussed.

At arrow 10 of FIG. 10, the SCP 720 again requests routing information, but in this embodiment the SCP 720 males the request to the RP 703. This enables the SCP 720 to operate in the invention without need for modification. The request can include the conference identifier obtained through the VRU 725.

At arrow 11, the RP 703 notifies the conference RP 721 of the routing request, and passes the conference identifier to the conference RP 721. The conference RP 721 can subsequently generate the routing information and therefore participate in the dynamic routing operation.

At arrow 12, as previously discussed, the conference RP 721 can optionally transmit the conference identifier to a bridge or bridges.

At arrow 13, the conference RP 721 programs the RP 703 with the routing information, as previously discussed.

At arrow 14, the RP 703 provides the routing information to the SCP 720 based on the routing information programmed into the RP 703.

At arrows 15, 16, and 17, the SCP 720 completes the conference call to the selected bridge 206, as previously discussed.

Figure 11:
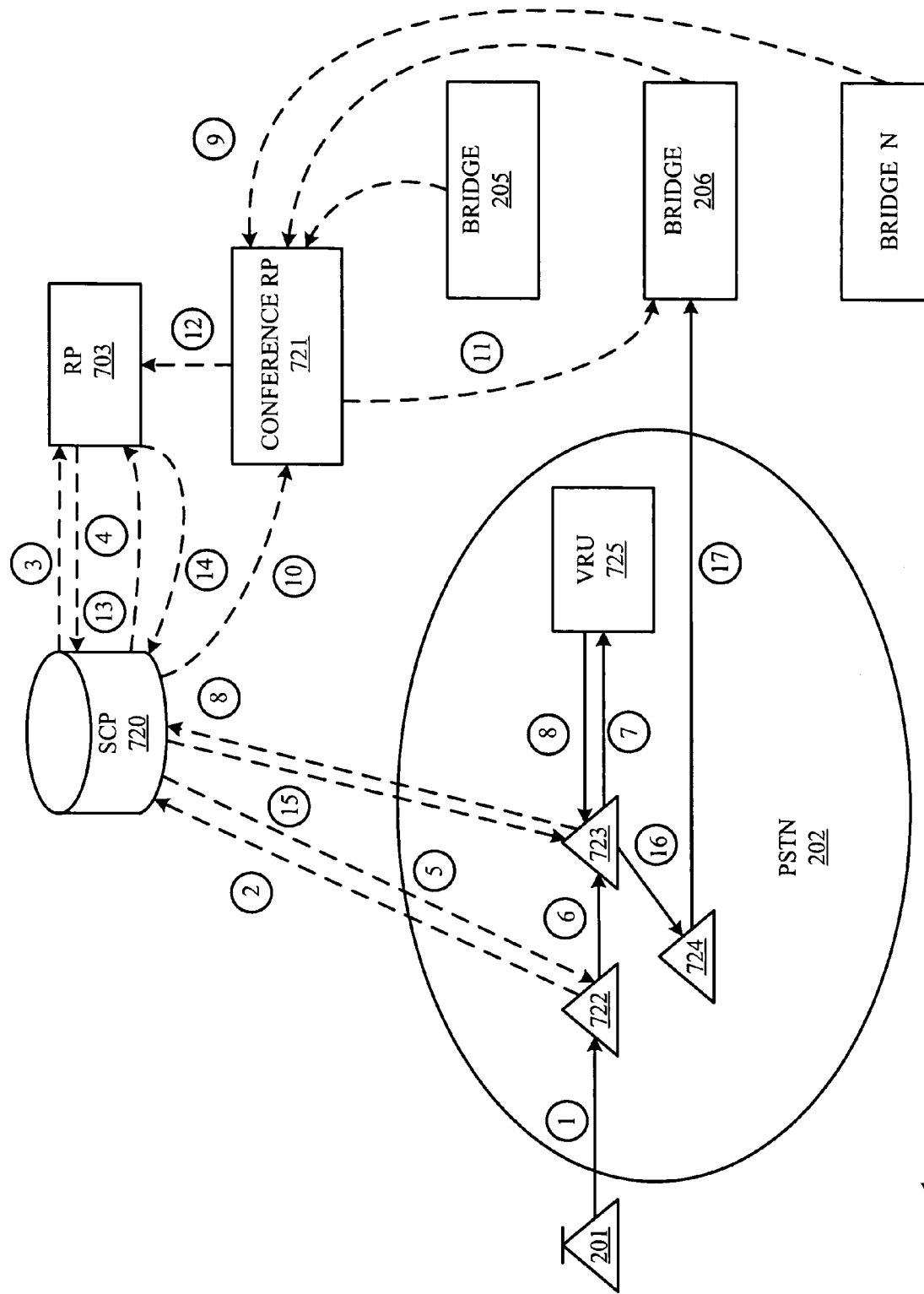
FIG. 11 is a diagram of a communication system according to another embodiment of the invention.
Figure 12:
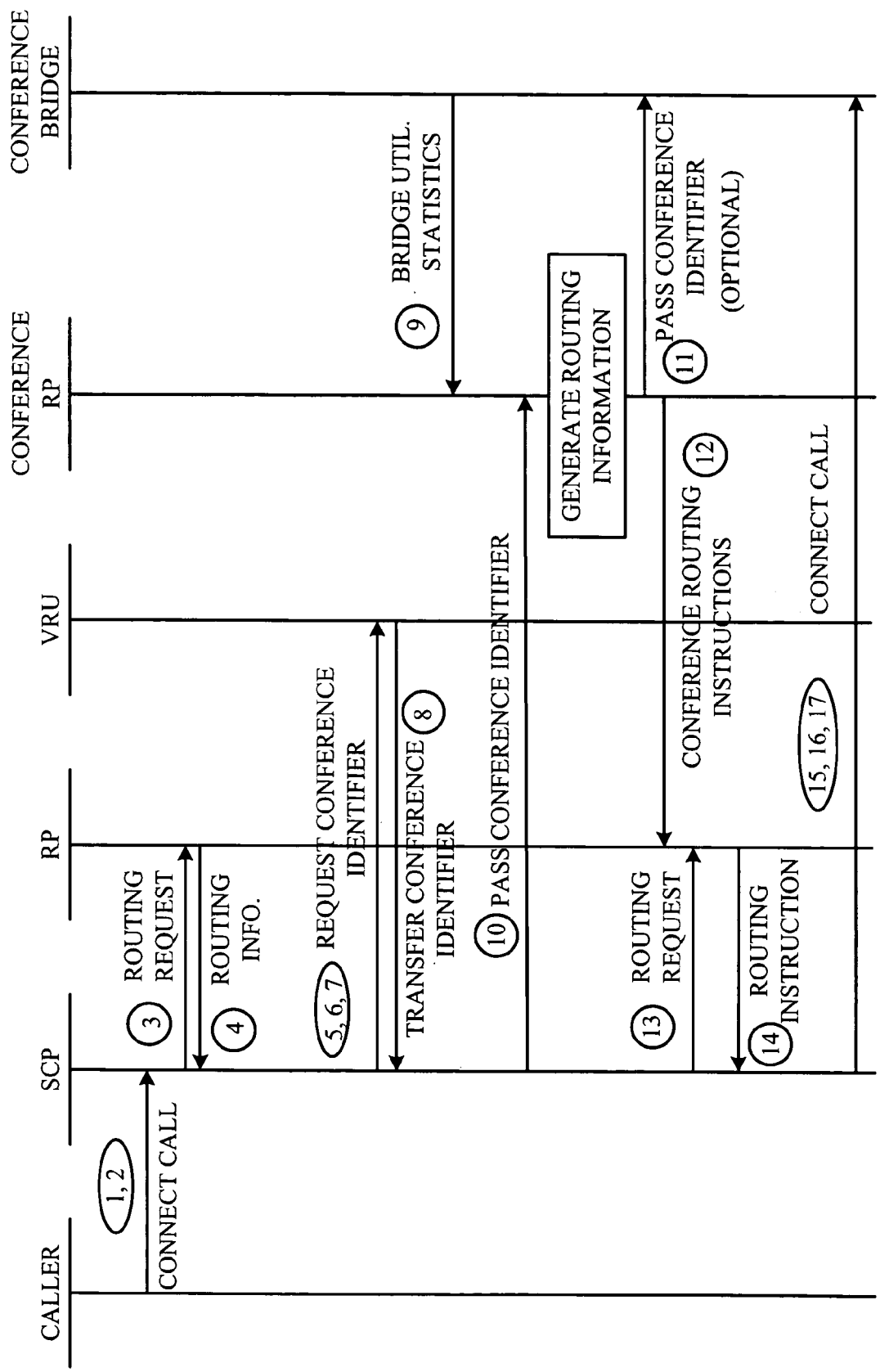
FIG. 12 is a corresponding message flow diagram that illustrates a dynamic routing operation according to the embodiment of FIG. 11.

FIG. 11 is a diagram of the communication system 700 according to yet another embodiment of the invention, while FIG. 12 is a corresponding message flow diagram that illustrates a dynamic routing operation according to the embodiment of FIG. 11. FIG. 11 is similar to FIG. 7 except that in the embodiment of FIG. 11 the conference RP 721 receives the conference identifier directly from the SCP 720 and programs the RP 703 before or concurrently with the routing request being received and acted upon by the RP 703. The difference can be seen in the message flow of FIG. 12, wherein arrows 1–11 and 14–16 are identical to those in FIG. 8 and will not be discussed.

At arrow 12 of FIG. 11, the conference RP 721 programs the RP 703 with the routing information, as previously discussed.

At arrow 13, the SCP 720 requests routing information from the RP 703.

Unlike the prior art, the routing of the invention is dynamic and routes a teleconference when it begins, not at the set-up phase, as in the prior art. The invention performs centralized routing, with the routing occurring in a telephone network, ahead of any conference systems or bridge facilities. The invention performs routing according to current conference system conditions, not merely on assigned capacity, as in the prior art. The invention geographically load balances teleconferences among conference systems, wherein the routing can take into account the geographic caller locations and the geographic conference systems locations, and can minimize distances between callers and conference systems. In contrast, the prior art does not route based on current loading conditions or geographic locations. The prior art does not perform dynamic load balancing. The prior art does not achieve centralized routing.

The dynamic routing according to the invention provides several benefits. The dynamic routing is performed in the telephone network before the conference systems or bridge facilities. The dynamic routing therefore can efficiently perform load balancing between conference systems and between bridge facilities. In addition, the invention achieves a centralized routing, wherein each bridge facility does not need a duplicative routing apparatus.

Moreover, the dynamic routing according to the invention can prevent traffic problems. The dynamic routing according to the invention routes teleconference participants to conference systems based on current conference system conditions. The invention does not consume extra telephone circuits or telephone lines in order to shift calls and perform load balancing. The dynamic routing allows geographic bridging, wherein an incoming conference participant can be routed based not only on traffic, but on a geographic caller location and on a geographic conference system location.

Another benefit is that the invention enables geographic scaling. New conference systems and bridge facilities can be constructed at geographically desirable locations, such as where a large amount of conference calls occur. The dynamic routing of the invention can integrate these new conference systems and can geographically route conference calls so as to minimize the number and physical length of the resulting telephone network connections.

Furthermore, the load balancing according to the invention can be performed before traffic problems occur. The invention can load conference systems to a higher level without incurring more traffic problems. For example, the present invention allows loading of conference bridges to between 80% and 90% of capacity. In addition, the invention allows different levels of conference service to be implemented. For example, a first level of conference service can be routed to conference systems having fairly high loading while a second level of conference service can be routed to conference systems that are loaded at a lower level, therefore decreasing likelihood of problems during a telephone conference.

What is claimed is:

1. A method of providing a conference among conference participants over a communication network, the method comprising:
   receiving conference utilization data from a plurality of conference systems;
   receiving a request to join the conference from one of the conference participants;
   processing the conference utilization data in response to the request to select one of the conference systems; and
   in the one conference system, joining the one participant to the conference in response to the selection of the one conference system.

2. The method of claim 1 wherein the conference utilization data indicates current utilization of the conference systems.

3. The method of claim 1 wherein the conference utilization data indicates unused capacity of the conference systems.

4. The method of claim 1 wherein processing the conference utilization data to select the one conference system comprises load balancing among the conference systems.

5. The method of claim 1 wherein the conference was assigned a conference identifier during a conference registration occurring before the request to join the conference, and wherein the request to join the conference indicates the conference identifier.

6. The method of claim 1 further comprising determining a geographic location of the one conference participant in response to the request.

7. The method of claim 6 further comprising processing the geographic location of the one conference participant to select the one conference system.

8. The method of claim 7 wherein the one conference participant comprises a conference host.

9. The method of claim 1 further comprising determining geographic locations of the conference systems, and in response to the request, determining a geographic location of the one conference participant and processing the geographic locations of the conference systems and the one conference participant to select the one conference system.

10. The method of claim 1 further comprising determining geographic locations of the conference systems and the conference participants, and in response to the request, processing the geographic locations of the conference systems and the conference participants to select the one conference system.

11. A system to provide a conference over a communication network among conference participants, the system comprising;
    a plurality of conference systems configured to transfer conference utilization data;
    a routing system configured to receive the conference utilization data, receive a request to join the conference from one of the conference participants, and process the conference utilization data in response to the request to select one of the conference systems; and wherein
    the one conference system is configured to join the one participant to the conference in response to the selection of the one conference system.

12. The system of claim 11 wherein the conference utilization data indicates current utilization of the conference systems.

13. The system of claim 11 wherein the conference utilization data indicates unused capacity of the conference systems.

14. The system of claim 11 wherein the routing system is configured to select the one conference system to load balance among the conference systems.

15. The system of claim 11 wherein the conference was assigned a conference identifier during a conference registration occurring before the request to join the conference, and wherein the request to join the conference indicates the conference identifier.

16. The system of claim 11 wherein the routing system is further configured to determine a geographic location of the one conference participant in response to the request.

17. The system of claim 16 wherein the routing system is further configured to process the geographic location of the one conference participant to select the one conference system.

18. The system of claim 17 wherein the one conference participant comprises a conference host.

19. The system of claim 11 wherein the routing system is further configured to determine geographic locations of the conference systems, and in response to the request, determine a geographic location of the one conference participant and process the geographic locations of the conference systems and the one conference participant to select the one conference system.

20. The system of claim 11 wherein the routing system is further configured to determine geographic locations of the conference systems and the conference participants, and in response to the request, process the geographic locations of the conference systems and the conference participants to select the one conference system.

* * * * *